United States Patent
Balakrishnan et al.

(10) Patent No.: US 7,400,122 B2
(45) Date of Patent: *Jul. 15, 2008

(54) METHOD AND APPARATUS FOR REDUCING AUDIO NOISE IN A SWITCHING REGULATOR

(75) Inventors: Balu Balakrishnan, Saratoga, CA (US); Alex B. Djenguerian, Saratoga, CA (US); Kent Wong, Fremont, CA (US)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/729,262

(22) Filed: Mar. 27, 2007

(65) Prior Publication Data

US 2007/0285068 A1 Dec. 13, 2007

Related U.S. Application Data

(63) Continuation of application No. 11/404,688, filed on Apr. 14, 2006, now Pat. No. 7,211,991, which is a continuation of application No. 11/100,065, filed on Apr. 5, 2005, now Pat. No. 7,045,994, which is a continuation of application No. 10/888,782, filed on Jul. 8, 2004, now Pat. No. 6,900,622, which is a continuation of application No. 10/659,911, filed on Sep. 11, 2003, now Pat. No. 6,784,646, which is a continuation of application No. 10/285,266, filed on Oct. 30, 2002, now Pat. No. 6,667,605, which is a continuation of application No. 09/634,237, filed on Aug. 8, 2000, now Pat. No. 6,525,514.

(51) Int. Cl.
*G05F 1/40* (2006.01)

(52) U.S. Cl. .................. 323/277; 323/283; 363/131

(58) Field of Classification Search ......... 323/282–286, 323/266–272, 222; 363/17, 19, 49, 97–98, 363/56

See application file for complete search history.

(56) References Cited

U.S. PATENT DOCUMENTS 3,978,393 A  8/1976  Wisner et al.

(Continued)

FOREIGN PATENT DOCUMENTS

EP  0875983 A  11/1998

(Continued)

OTHER PUBLICATIONS

Power Integrations, Inc. "TinySwitch Family," TNY253-254-255, product information, pp. 1-16, (Feb. 1999).

*Primary Examiner*—Rajnikant B Patel
(74) *Attorney, Agent, or Firm*—Blakely Sokoloff Taylor & Zafman LLP

(57) ABSTRACT

A switching regulator utilizing on/off control that reduces audio noise at light loads by adjusting the current limit of the switching regulator. In one embodiment, a switching regulator includes a state machine that adjusts the current limit of the switching regulator based on a pattern of feedback signal values from the output of the power supply for a preceding N cycles of the drive signal. The state machine adjusts the current limit lower at light loads such that cycles are not skipped to reduce the operating frequency of the switching regulator into the audio frequency range until the flux density through the transformer is sufficiently low to reduce the generation of audio noise.

10 Claims, 9 Drawing Sheets

U.S. PATENT DOCUMENTS

| | | | |
|---|---|---|---|
| 4,058,758 A | 11/1977 | Peterson | |
| 4,151,387 A * | 4/1979 | Peters, Jr. | 219/626 |
| 4,353,113 A | 10/1982 | Billings | |
| 4,533,986 A | 8/1985 | Jones | |
| 4,791,544 A | 12/1988 | Gautherin et al. | |
| 5,013,998 A | 5/1991 | Varga et al. | |
| 5,034,871 A | 7/1991 | Okamoto et al. | |
| 5,260,861 A | 11/1993 | Wert | |
| 5,302,889 A | 4/1994 | Marsh | |
| 5,408,173 A | 4/1995 | Knapp | |
| 5,479,088 A | 12/1995 | Hayakawa et al. | |
| 5,844,790 A | 12/1998 | Jacobs et al. | |
| 5,850,336 A * | 12/1998 | Nakajima | 363/39 |
| 5,966,004 A | 10/1999 | Kadanka | |
| 6,104,622 A | 8/2000 | Shin | |
| 6,108,183 A * | 8/2000 | Beene | 361/93.8 |
| 6,114,833 A | 9/2000 | Langston et al. | |
| 6,198,261 B1 | 3/2001 | Schultz et al. | |
| 6,208,533 B1 | 3/2001 | Ogawa | |
| 6,525,514 B1 | 2/2003 | Balakrishnan et al. | |
| 6,667,605 B2 | 12/2003 | Balakrishnan et al. | |
| 6,784,646 B2 | 8/2004 | Balakrishnan et al. | |
| 6,900,622 B2 | 5/2005 | Balakrishnan et al. | |

FOREIGN PATENT DOCUMENTS

| | | |
|---|---|---|
| EP | 01306615 | 8/2002 |
| JP | 02-262868 | 10/1990 |
| JP | 03-022862 | 1/1991 |
| JP | 03-050979 | 5/1991 |
| JP | 2000-217352 | 8/2000 |

* cited by examiner

METHOD AND APPARATUS FOR REDUCING AUDIO NOISE IN A SWITCHING REGULATOR

REFERENCE TO PRIOR APPLICATIONS

This application is a continuation of U.S. application Ser. No. 11/404,688, filed Apr. 14, 2006, now U.S. Pat. No. 7,211, 991, which is a continuation of and claims priority to U.S. application Ser. No. 11/100,065, filed Apr. 5, 2005, now U.S. Pat. No. 7,045,994 B2, which is a continuation of U.S. application Ser. No. 10/888,782, filed Jul. 8, 2004, now U.S. Pat. No. 6,900,622, which is a continuation of and claims priority to U.S. application Ser. No. 10/659,911, filed Sep. 11, 2003, now U.S. Pat. No. 6,784,646 B2, which is a continuation of and claims priority to Ser. No. 10/285,266, filed Oct. 30, 2002, now U.S. Pat. No. 6,667,605 B2, which is a continuation of and claims priority to U.S. application Ser. No. 09/634, 237, filed Aug. 8, 2000, now U.S. Pat. No. 6,525,514 B1.

BACKGROUND OF THE INVENTION

1. Field of the Invention

The present invention relates generally to power supplies and, more specifically, the present invention relates to a switching regulator.

2. Background Information

Electronic devices use power to operate. Switched mode power supplies are commonly used due to their high efficiency and good output regulation to power many of today's electronic devices. In a known switched mode power supply, a low frequency (e.g. 50 or 60 Hz mains frequency), high voltage alternating current (AC) is converted to high frequency (e.g. 30 to 300 kHz) AC, using a switched mode power supply control circuit. This high frequency, high voltage AC is applied to a transformer to transform the voltage, usually to a lower voltage, and to provide safety isolation. The output of the transformer is rectified to provide a regulated DC output, which may be used to power an electronic device. The switched mode power supply control circuit usually provides output regulation by sensing the output and controlling it in a closed loop.

A switched mode power supply may include an integrated circuit switching regulator, which may include a power switch or transistor coupled in series with a primary winding of the transformer. Energy is transferred to a secondary winding of the transformer by turning on and off of the power transistor in a manner controlled by the switching regulator to provide a clean and steady source of power at the DC output. In a known switching regulator, a feedback current is sampled from the output of the DC output of the power supply. When the feedback current is below a regulation threshold, the power switch is switched at a constant frequency. However, when the feedback current is above a regulation threshold, the switching regulator is disabled, resulting in a skipped cycle of the power switch.

When cycles are skipped by a switching regulator as described above, the resulting frequency of operation of the switching regulator is reduced. Thus, the frequency of operation of the switching regulator is varied as cycles are skipped to regulate the DC output of the power supply, with the frequency decreasing as the load coupled to the DC output decreases. Generally, when the frequency of operation of known power supplies of this type drop to frequencies within the audio frequency range, such as within 20 Hz to 20 kHz, undesirable audio noise is generated by the transformers of the power supplies.

SUMMARY OF THE INVENTION

Switching regulator methods and apparatuses are disclosed. In one embodiment, a switching regulator includes a power switch coupled between first and second terminals. The first terminal is coupled to an energy transfer element of a power supply and the second terminal to be coupled to a supply rail of the power supply. A drive signal generator circuit is coupled to a third terminal to receive a feedback signal representative of an output of the power supply. The drive signal generator generates a drive signal coupled to control switching of the power switch in response to the feedback signal. The drive signal generator circuit selectively disables each on period of the drive signal in response to the feedback signal to regulate the output of the power supply. A current limit circuit is coupled to the power switch and the drive signal generator circuit to control the drive signal to limit a current flow through the power switch. The current limit circuit includes a plurality of current limit settings for the power switch that are selected in response to the feedback signal. Additional features and benefits of the present invention will become apparent from the detailed description, figures and claims set forth below.

BRIEF DESCRIPTION OF THE DRAWINGS

The present invention detailed illustrated by way of example and not limitation in the accompanying figures.

DETAILED DESCRIPTION

Figure 1:
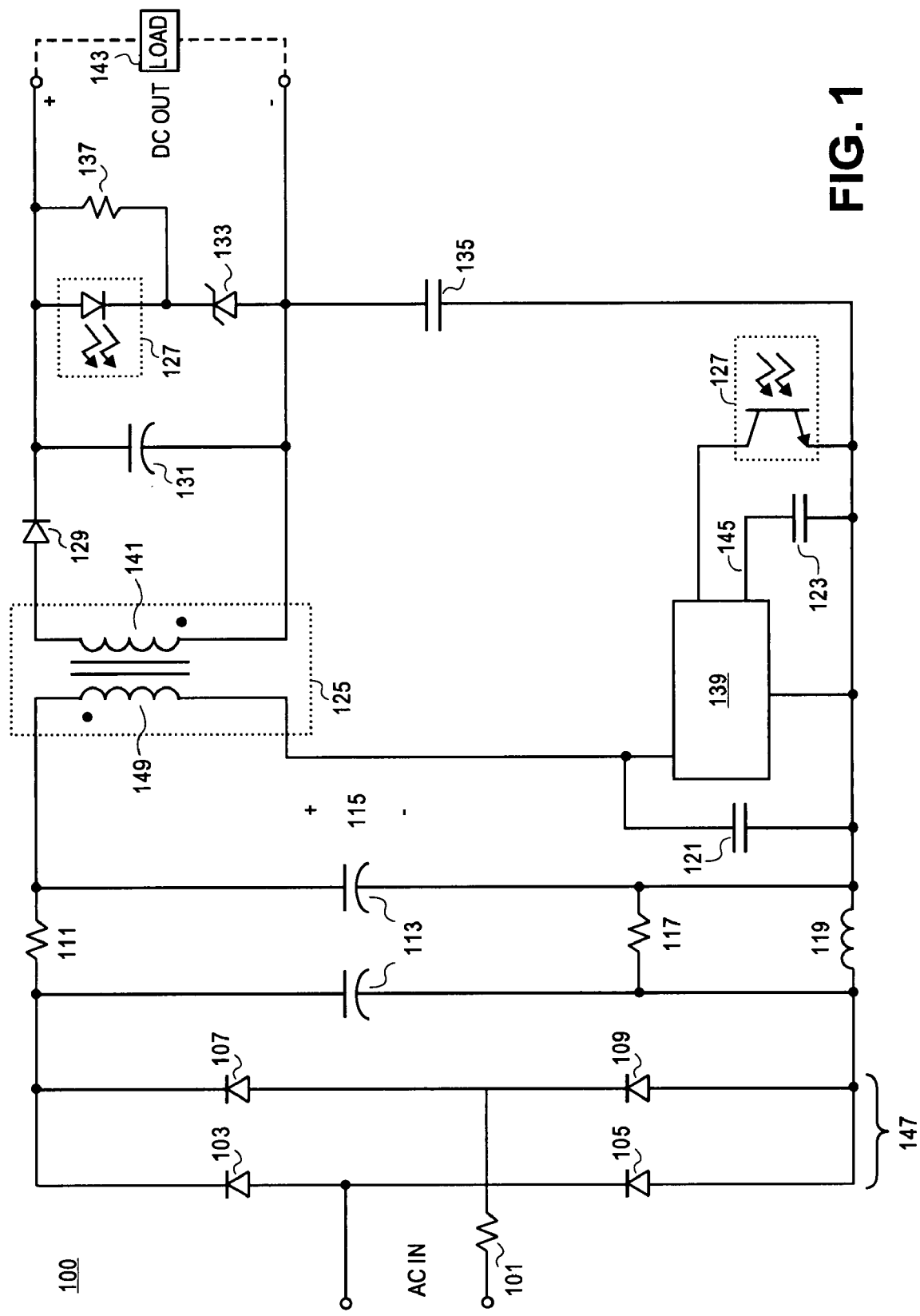
FIG. 1 is a schematic illustrating one embodiment of a power supply including a switching regulator in accordance with the teachings of the present invention.

Method and an apparatus for regulating a power supply are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one embodiment, a switching regulator in accordance with the teachings of the present invention operates in a manner such that modes of operation in the audible frequency range are avoided. One embodiment of the switching regulator includes a state machine, with each state representing a current limit level. At full load, the current limit is at the full level. As the load decreases, the frequency decreases until it is approximately 20 kHz, the level at the upper end of the audible frequency range. At this point, a state transition to one with a lower current limit is executed. In order to provide the same power to the output, the feedback loop will request more switching cycles, thus increasing the frequency of operation. Therefore, the frequency is maintained above the audio frequency range at this point. In one embodiment, this process is repeated as the load is reduced until the state with the lowest current limit has been reached. This state has a current limit level that is low enough such that the flux density through the power supply transformer does not cause the transformer to produce unacceptable levels of audio noise. Therefore, the flux density through the transformer is limited to low values with the selected low current limit levels when the switching regulator operates within the audible frequency range due to light loads.

In one embodiment, the switching regulator senses a feedback current that is determined by the status of the regulation of the output of the power supply. The more the output is below its desired level, the lower the magnitude of this current becomes. As will be shown, if the magnitude of this current is below a set threshold, a digital signal inside the regulator circuit, referred to herein as an Enable signal, will become logic level one and the switching regulator circuit will switch. If the magnitude of this current is above a set threshold, the Enable signal will become logic level zero and the switching regulator circuit will skip a cycle.

As will be discussed, a state machine and a plurality of current limit settings are utilized in accordance with the teachings of the present invention. In one embodiment, the state is in a low state at start-up of the switching regulator. The low state selects a lowest current limit setting of one embodiment of the switching regulator. If this current limit in the low state is insufficient to regulate the output, which can happen at start-up or if the load is increased, the regulator circuit will not skip any cycles.

In one embodiment, after a pattern of N equals six consecutive Enable digital ones for a preceding N equals six consecutive switching cycles at the lowest state, the state machine transitions to the a medium state, which corresponds to a medium current limit level. If for some reason the load is reduced and the regulator circuit encounters N equals six consecutive Enable digital zeroes, which results in N equals six consecutive skipped cycles, the state machine makes a transition back to the low state. This prevents the regulator circuit from operating in the audible range in the medium state. In one embodiment, if the current limit in the medium state is insufficient to regulate the output, which can happen at start-up or if the load is increased, the regulator circuit will not skip any cycles.

In one embodiment, after a pattern of N equals six consecutive Enable digital ones for a preceding N equals six consecutive switching cycles at the medium state, the state machine transitions to the high state, which corresponds to a high current limit level. If for some reason the load is reduced and the regulator circuit encounters N equals six consecutive Enable digital zeroes, which results in N equals six consecutive skipped cycles, the state machine makes a transition back to the medium state. This prevents the regulator circuit from operating in the audible range in the high state. If the current limit in the high state is insufficient to regulate the output, which can happen at start-up or if the load is increased, the regulator circuit will not skip any cycles.

In one embodiment, after a pattern of N equals six consecutive Enable digital ones for a preceding N equals six consecutive switching cycles at the high state, the state machine transitions to a state with a high current limit level, referred to herein as a super high state, but one without any skipping of cycles. In this super-high state, an Enable digital one results in a switching cycle at the high current limit level, while an Enable digital zero results in a switching cycle at the medium current limit level. This prevents the skipping of cycles at a frequency in the audio frequency range. If for some reason the load is reduced and the regulator circuit encounters N equals six consecutive Enable digital zeroes, the state machine makes a transition back to the high state with the skipping of cycles.

In one embodiment, the various plurality of current limit levels and the point of transition from one level to the next are carefully optimized. In one embodiment, the state machine in accordance with the teachings of the present invention is designed such that oscillations between states do not occur. If these oscillations occur at a sufficiently high frequency, the audio noise problem can reappear. These problems can occur if a load exists such that it cannot be handled by any combination of switching and skipping in any state. For example, the energy generated by one switching cycle followed by 5 skipped cycles at the high current limit level can be too much for a certain load. If, at the same time, the energy generated by one skipped cycle followed by 5 switching cycles at the medium current limit level is too little to regulate this same load, then the state machine will oscillate between the two states, possibly causing audio noise. Thus the energy levels of the different states overlap in one embodiment. The current limit levels of the various states are not separated by a substantially large degree. In addition, the number of N cycles of delay required for changing states is not too small. For instance, N is equal to 6 in one embodiment. It is appreciated however that in other embodiments, N may be greater than or less than 6.

In one embodiment, stability of the state machine is improved to a greater degree while at the same time maintaining the transient response at start-up to a heavy load. Increased stability is realized in this embodiment with the inclusion of yet another current limit level state by incorporating hysteretic behavior in the medium state. The medium current limit level is split into two distinct levels, a lower medium level and an upper medium level.

In one embodiment, after power-up when the regulator circuit first enters the medium state, the current limit will be set to the lower medium level. If the regulator circuit transitions to the high state and then back to the medium state, the current limit will be set to the upper medium level. If the state machine receives the pattern of N consecutive Enable digital zeroes that cause the transition from the upper medium state to the low state and if it then receives the consecutive Enable digital ones to transition back to the medium state, then the current limit will be set to the lower medium level. The upper medium and lower medium states in accordance with the teachings of the present invention are two different states with different current limit levels. The benefit of this embodiment is mainly in transient response as it would take less cycles to move from one end of the states to the other end.

To illustrate, FIG. 1 is a schematic illustrating one embodiment of a power supply 100 including a switching regulator 139 in accordance with the teachings of the present invention. As shown, an alternating current (AC) mains voltage is input through resistor 101 into bridge rectifier 147, including diodes 103, 105, 107 and 109, which provides a rectified signal to power supply capacitors 113 that provide input DC voltage to primary winding 149 of energy transfer element or transformer 125. It is appreciated that supply rails are provided at the ends of bridge rectifier 147. Switching regulator circuit 139 allows current to flow through primary winding 149 during its on state of each switching cycle and acts as open circuit when in its off state. When current flows through primary winding 149, transformer 125 is storing energy. When no current is flowing through primary winding 149, any energy stored in transformer 125 is delivered from secondary winding 141 to capacitor 131. Capacitor 131 delivers power to the load 143. The voltage across the load 143 will vary depending on the amount of energy stored in the transformer 125 in each switching cycle which is in turn dependent on the length of time current is flowing through primary winding 149 in each switching cycle.

In one embodiment, the sum of the voltage drop across optocoupler 127 and the reverse break down voltage of zener diode 133 is approximately equal to the desired output threshold level across load 143. When the voltage across the load 143 reaches the threshold level, current begins to flow through optocoupler 127 and zener diode 133 that in turn is used to disable the switching regulator circuit 139. In one embodiment, whenever switching regulator circuit 139 is in the off-state the regulator circuit power supply bypass capacitor 123 is charged to the operating supply voltage, which in one embodiment is typically 5.7 volts by allowing a small current to flow from bypass terminal 145 to the switching regulator circuit power supply bypass capacitor 123. Regulator circuit power supply bypass capacitor 123 is used to supply power to operate switching regulator circuit 139 when it is in the on-state.

In one embodiment, switching regulator circuit 139 operates in the following fashion under most loads except with very heavy loads which is described later. When the switching regulator circuit 139 is disabled, an open circuit condition is created in primary winding 149 and transformer 125 does not store energy. The energy stored in the transformer 125 from the last cycle of switching regulator circuit 139 is then delivered to secondary winding 141, which in turn supplies power to load 143 at the output of the power supply 100. Once the remaining energy in transformer 125 is delivered to the load 143 the voltage of the load 143 will decrease.

When the voltage at the load 143 decreases below the threshold level, current ceases to flow through optocoupler 127 and switching regulator circuit 139 resumes operation either instantaneously or nearly instantaneously. Under very heavy loads, the switching regulator circuit 139 in one embodiment operates in a slightly altered fashion. The current limit level chosen by a state machine included in one embodiment of switching regulator circuit 139 is the highest level under very heavy load. However, the switching regulator circuit 139 will not entirely cease to operate when the voltage at the load is above the threshold level. Instead it will operate at a lower current limit level.

As mentioned, one embodiment of switching regulator circuit 139 includes a state machine that, depending on the load 143, chooses the appropriate current limit level among a discrete and finite number of a plurality of current limit levels. The selected current limit level turns off the switching regulator circuit 139 when the current flowing through the primary winding 149 or switching regulator circuit 139 rises above the selected current threshold level.

Figure 2:
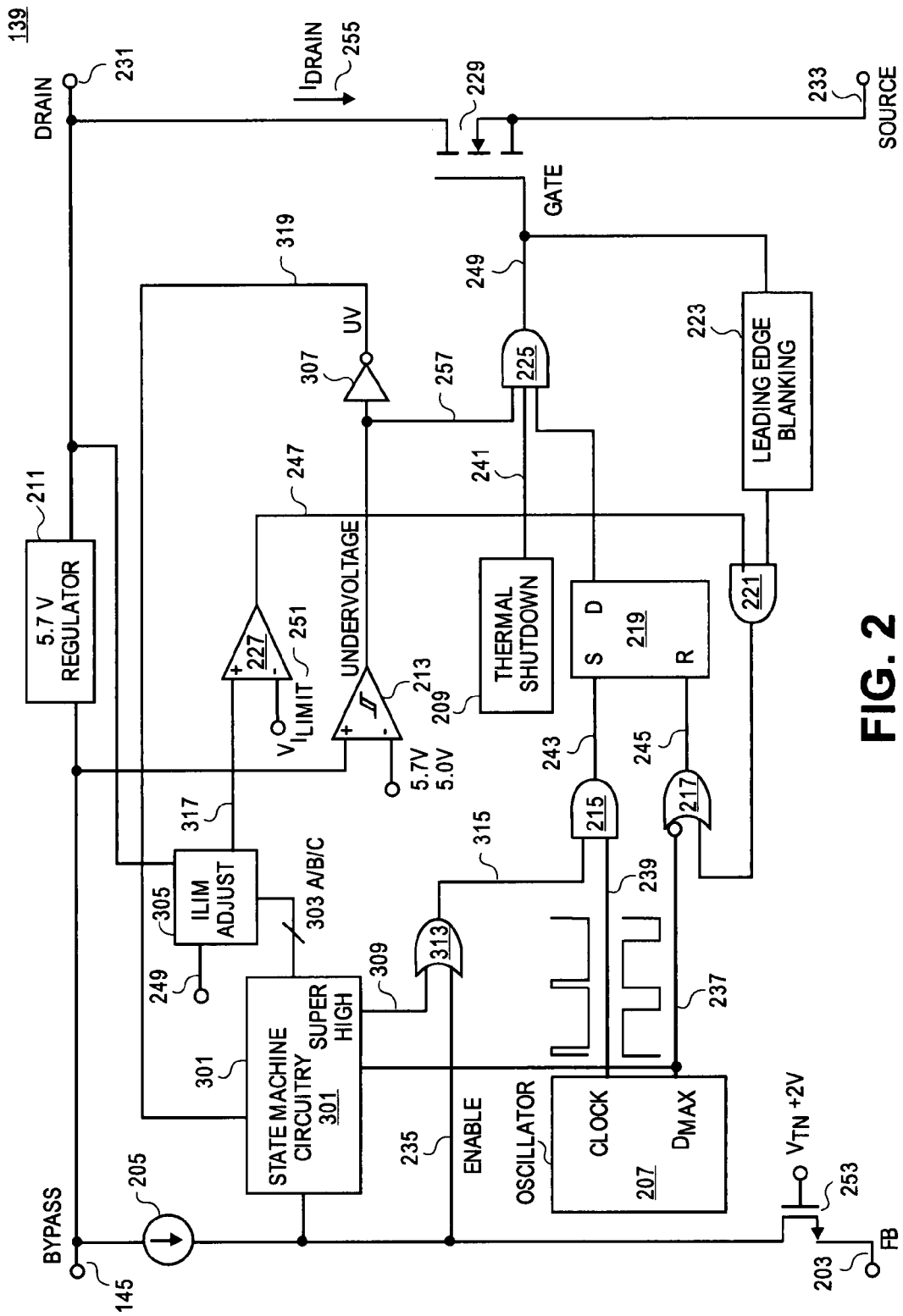
FIG. 2 is a schematic illustrating one embodiment of a switching regulator in accordance with the teachings of the present invention.

FIG. 2 is a schematic illustrating one embodiment of a switching regulator 139 in accordance with the teachings of the present invention. As shown, switching regulator circuit 139 includes a power switch or metal oxide semiconductor field effect transistor (MOSFET) 229 that is coupled between a drain terminal 231 and a source terminal 233. MOSFET 229 is switched on and off according to a drive signal 249 generated by a drive signal generator. In one embodiment, drive signal 249 is input into the gate of MOSFET 229 by AND gate 225. In one embodiment, drive signal generator includes AND gates 215 and 225, OR gate 217, latch 219, oscillator 207, state machine circuitry 301, current limit adjust circuitry 305 and their associated elements. The input of AND gate 225 includes an output of a latch 219, a bypass terminal voltage indicator 257 provided by undervoltage comparator 213, and a thermal status signal 241 from thermal shut-down circuit 209. In one embodiment, Maximum duty cycle signal 237 generated by oscillator 207 determines the maximum time that MOSFET 229 can conduct in each cycle of operation.

When the phototransistor 127 current being pulled out of the feedback input 203 is greater than the current source 205, Enable signal 235 will be pulled to a low state. When the phototransistor 127 current being pulled out of the feedback input 203 is less than the current source 205, Enable signal 235 will be pulled to a high state. As shown, Enable signal 235 is also coupled to be received by the state machine circuitry 301. State machine circuitry 301 will send signals 303 to the current limit (Ilim) Adjust circuitry 305, setting the current limit of $I_{drain}$ 255 through MOSFET 229 or primary winding 149 to be lower in light load or higher in high load. In one embodiment, there are three signals 303a, 303b and 303c included in signals 303.

In one embodiment, current limit adjust circuitry 305 adjusts the current limit in digital steps. Transitions to a higher current limit state occur after a pattern of N consecutive Enable signal 235 logic highs. Transitions to a lower current limit state occur after a pattern of N consecutive Enable signal 235 logic lows. In one embodiment, N equals 6. At a sufficiently high current limit state, super high signal 309 output of state machine circuitry 301 will be set to be logic high state. As a result, OR gate 313 will set signal 315 to be high when either the state machine circuitry 301 is in the super high state or when Enable signal 235 is high. Signal 315 ultimately determines whether a switching cycle will occur. Thus, when the state machine circuitry 301 is not in the super-high state, the Enable signal 235 determines whether or not a switching cycle will occur. However, when the state machine circuitry 301 is in the super-high state and super high signal 309 is in a logic high state, all switching cycles will occur at either one of two designated current limit levels.

In one embodiment, the inputs to latch 219 include an OR gate output signal 245 and an AND gate output signal 243. The AND gate output signal 243 is high only when signal 315 and clock signal 239 generated by oscillator 207 are both high. Thus, AND gate 215 provides output when logical high signal 315 is received and clock signal 239 is provided by oscillator 207. In operation, when signal 315 is high, the clock signal 239 is transferred to latch 219 by the AND gate 215, thereby setting the latch 219 and enabling that cycle to go through and turn on the MOSFET 229. Conversely, when the signal 315 is low, it blocks the clock signal from setting the latch 219, and keeps the MOSFET 229 off during that cycle.

In one embodiment, OR gate output signal 245 is provided by OR gate 217 when the current threshold limit is reached or during the time when maximum duty cycle signal 237 is in an off state. In operation, OR gate output signal 245 is high when either the maximum duty cycle signal 237 is low or when the current limit is reached after the leading edge blanking delay, which is determined by leading edge blanking circuit 223, in order to turn off the MOSFET 229.

In one embodiment, signal 317 generated by current limit adjust circuitry 305 is a voltage level proportional to the voltage across the MOSFET 229 on-resistance. Current limit states are determined by signals 303a, 303b and 303c, which are generated by state machine circuitry 301. At higher current limit states, current limit adjust circuitry 305 changes signal 317 to become a lower proportion of the MOSFET 229 on-resistance voltage. At lower current limit states, block 305 causes signal 317 to become a higher proportion of the MOSFET 229 on-resistance voltage. Current threshold comparator 227 then compares signal 317 to a set voltage, current threshold limit voltage $V_{ILIMIT}$ 251. If signal 317 is above the current threshold limit voltage $V_{ILIMIT}$ 251 the current limit signal is triggered and the MOSFET 229 is turned off and then will not begin conducting until the beginning of the next on-time.

In one embodiment, the switching regulator circuit 139 turns off the MOSFET 229 after the current on cycle when the signal 315 is pulled low and creates a condition where there will be no additional power supplied to the load. Accordingly, signal 315 in response to the output of power supply 100 selectively allows the on time of a current cycle of drive signal 249 to be maintained and not allow or disable an on time of a next cycle of drive signal 249. When signal 315 is pulled high, the MOSFET 229 will resume operation upon the beginning of the next on-period of the maximum duty cycle signal 237.

In one embodiment, a bypass circuit or 5.7V regulator 211, which includes the current source from the drain terminal 231 to the bypass terminal 145, regulates the power level of regulator circuit power supply bypass capacitor 123 at a voltage level, which in one embodiment is 5.7 volts. This is done by charging the switching regulator circuit 139 power supply bypass capacitor 123 when the MOSFET 229 is not conducting. In one embodiment, undervoltage comparator 213 prevents the MOSFET 229 from conducting again until the voltage at bypass terminal 145 reaches the desired voltage level. Inverter 307 is used to invert the output of an undervoltage comparator 213.

Figure 3:
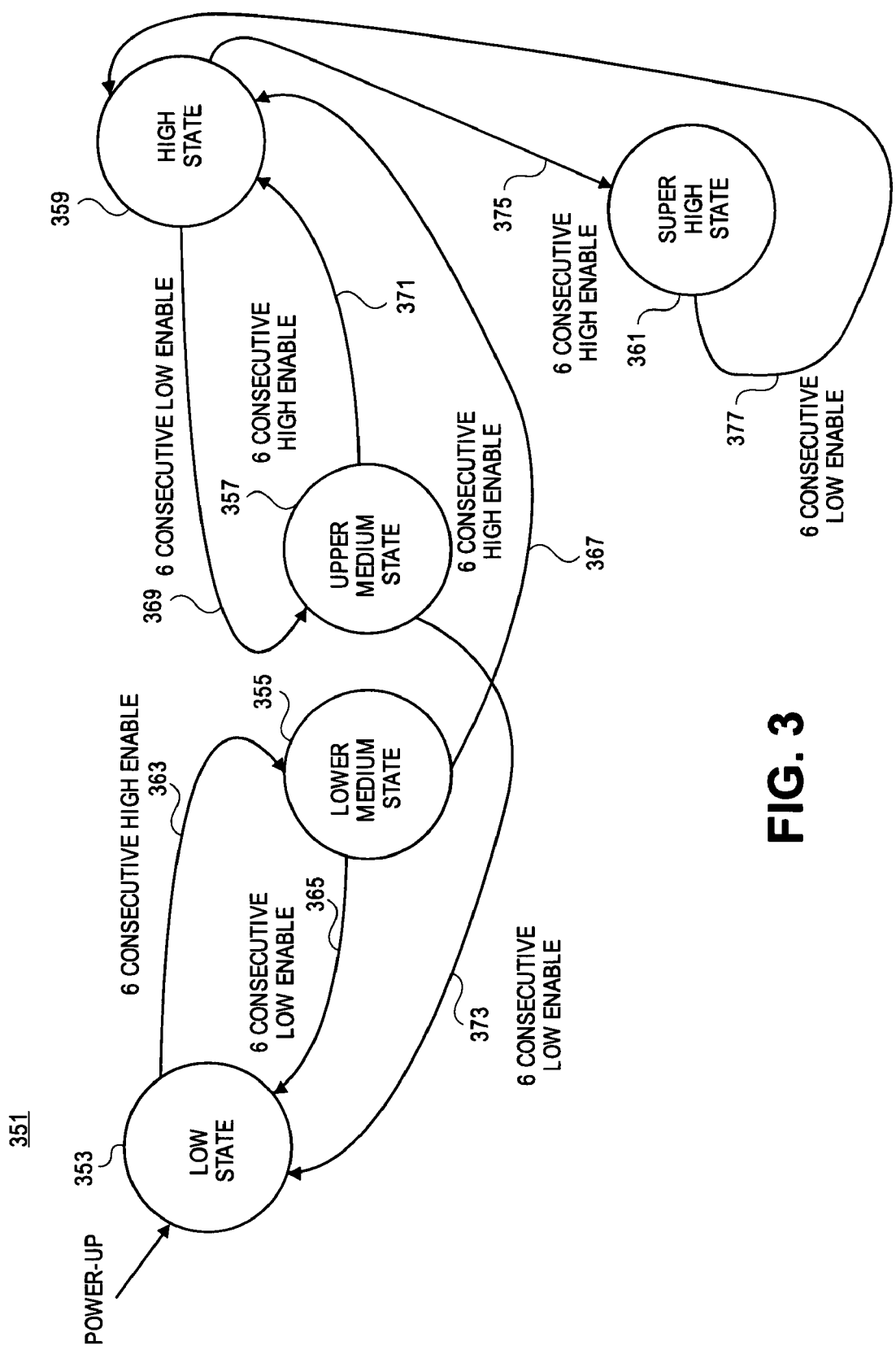
FIG. 3 is a state machine diagram illustrating one embodiment of the processing flow between states of a state machine in accordance with the teachings of the present invention.

FIG. 3 is a state machine diagram 351 illustrating one embodiment of the processing flow between states of state machine circuitry 301 in accordance with the teachings of the present invention. As shown, one embodiment of state machine diagram includes five states: low state 353, lower medium state 355, upper medium state 357, high state 359 and super high state 361. In one embodiment, each state selects from a plurality of current limit settings for current limit adjust circuitry 305. Table 1 below summarizes the current limit settings or cycle skipping settings selected by the states according to one embodiment of the present invention.

TABLE 1

State Machine Current Limit Settings

| STATE | ENABLE = 0 | ENABLE = 1 |
| --- | --- | --- |
| low | skip | 0.4 Ilim-max |
| lower medium | skip | 0.5 Ilim-max |
| upper medium | skip | 0.7 Ilim-max |
| high | skip | Ilim-max |
| super high | 0.5 Ilim-max | Ilim-max |

As shown in the embodiment summarized in Table 1, when in low state 353, a cycle of drive signal 249 is skipped when Enable signal 235 is low and the current limit setting is 0.4 Ilim-max when Enable signal 235 is high. When in lower medium state 355, a cycle of drive signal 249 is skipped when Enable signal 235 is low and the current limit setting is 0.5 Ilim-max when Enable signal 235 is high. When in upper medium state 357, a cycle of drive signal 249 is skipped when Enable signal 235 is low and the current limit setting is 0.7 Ilim-max when Enable signal 235 is high. When in high state 359, a cycle of drive signal 249 is skipped when Enable signal 235 is low and the current limit setting is Ilim-max when Enable signal 235 is high. When in super high state 361, the current limit setting is 0.5 Ilim-max when Enable signal 235 is low and the current limit setting is Ilim-max when Enable signal 235 is high. Note that in one embodiment, no cycles are skipped in drive signal 249 when in super high state 361. It is also noted that in one embodiment, the lower current limit settings, e.g. 0.4 Ilim-max, result in low flux density through the transformer 125 when switching regulator circuit 139 operates at lower frequencies within the audible frequency range (e.g. 20 Hz to 20 kHz). As a result, unacceptable audio noise is not generated by power supply 100 in accordance with the teachings of the present invention. Stated differently, a switching regulator circuit 139 in accordance with the teachings of the present invention will not operate within the audible frequency range unless the flux density is limited to be below a sufficiently low threshold value to reduce the generation of undesired audible noise.

As shown in FIG. 3, at power-up the state machine circuitry 301 starts at low state 353. The state machine circuitry 301 will stay in the low state 353 until a pattern of N equals 6 consecutive high Enable signals 235 occur. In one embodiment, this will be the case when the output load 143 is light. The state machine circuitry 301 will move up to lower medium state 355 upon the occurrence of a pattern of N equals 6 consecutive high Enable signals 235. This is illustrated in FIG. 3 with transition 363. The state machine circuitry 301 will stay in this state under a medium load 143. If the load 143 is further increased, a pattern of N equals 6 consecutive high Enable signals 235 will occur again and the state machine circuitry 301 will move up to high state 359, and similarly to super high state 361. This is illustrated in FIG. 3 with transitions 367 and 375, respectively. If the load 143 is decreased, the state machine circuitry 301 will move down upon the occurrence of a pattern of 6 consecutive low Enable signals 235 until the appropriate state is established. For instance, transition 377 illustrates state machine circuitry 301 changing from super high state 361 to high state 359, transition 369 illustrates state machine circuitry 301 changing from high state 359 to upper medium state 357 and transition 373 illustrates state machine circuitry 301 changing from upper medium state 357 to low state 353.

As mentioned earlier, improved transient response is provided for state machine circuitry 301 by incorporating hysteretic behavior in the medium state. Indeed, the medium state is separated into lower medium state 355 and upper medium state 357. Accordingly, hysteretic behavior in the selection of current limit levels is provided using lower medium state 355 and upper medium state 357 in accordance with the teachings of the present invention.

In one embodiment, the current limit levels are chosen such that the power level delivered in different states are overlapping. For example, maximum power level delivered in upper medium state 357 when a pattern of 5 consecutive high Enable signals 235 are followed by one low Enable signal 235 is higher than the minimum power delivered in the high state 359 when a pattern of 5 consecutive low Enable signals 235 are followed by one high Enable signal 235. Therefore, the maximum power delivered to the output of the power supply for the upper medium state 357 current limit settings when the power supply 100 operates at a maximum on/off cycle ratio is greater than a minimum power delivered to the output of the power supply the high state 359 current limit settings when the power supply operates at a minimum on/off cycle ratio.

Figure 4:
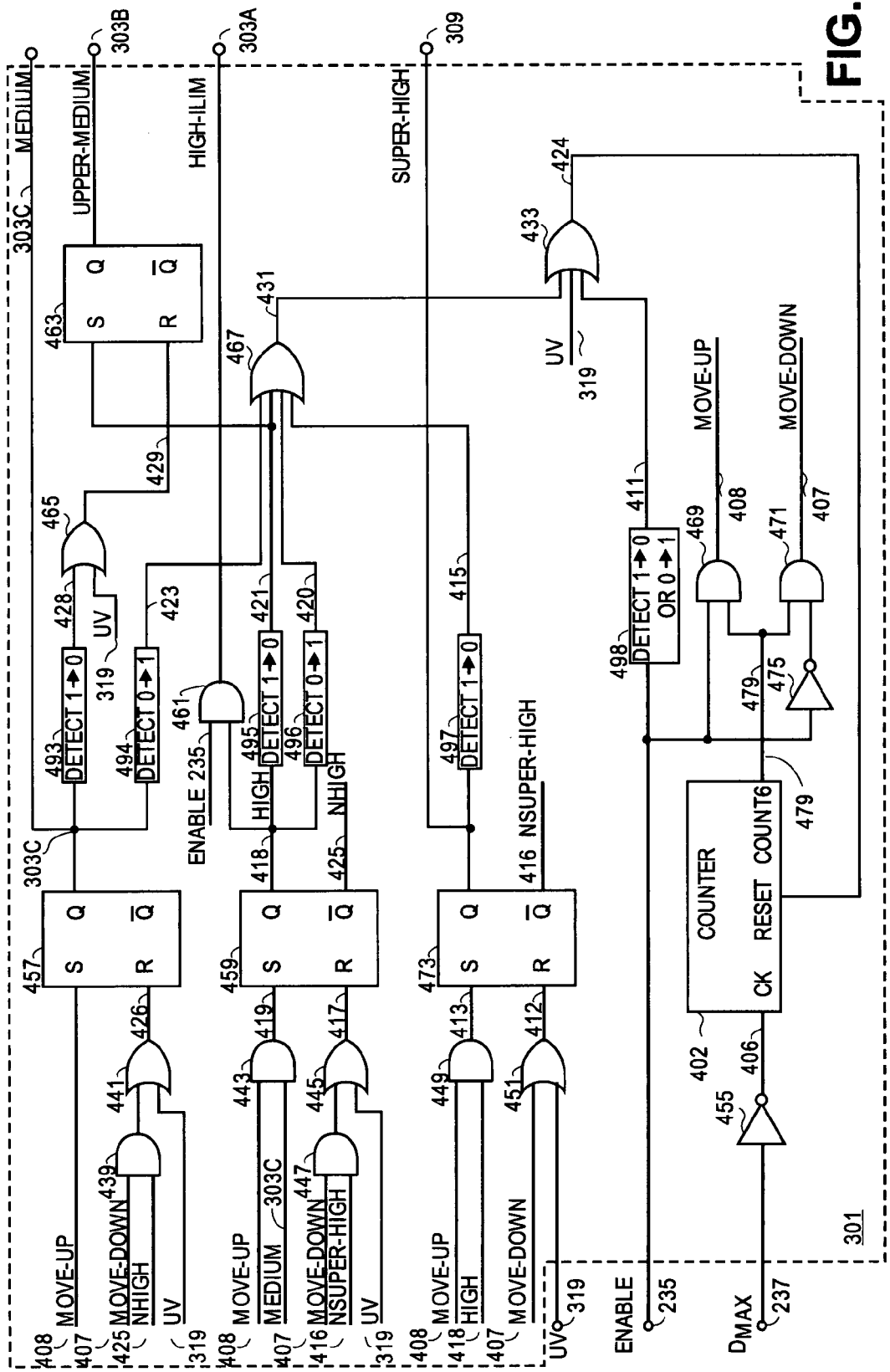
FIG. 4 is a schematic illustrating one embodiment of state machine circuitry in accordance with the teachings of the present invention.

FIG. 4 is a schematic illustrating one embodiment of state machine circuitry 301 of switching regulator circuit 139 in accordance with the teachings of the present invention. As illustrated, in one embodiment, the inputs to state machine circuitry 301 are the Enable signal 235, the undervoltage (UV) signal 319 and the maximum duty cycle (Dmax) signal 237. The outputs of state machine circuitry 301 are a one bit super high signal 309 and a three bit signal 303a/b/c including the high-Ilim signal 303a, the upper medium signal 303b, and the medium signal 303c.

In operation, during power up, all the latches 457, 459, 473, and 463 are reset to 0 through the UV signal 319. This places the state machine at low state 353.

During power-up, a counter 402 is also reset to the count 0 (000 in binary) because UV signal 319 is high, causing or-gate 433 to keep signal 424 high. In one embodiment, counter 402 is a 3 bit counter. In one embodiment, on each falling edge of Dmax 237 signal, the counter 402 counts to the next number. In one embodiment, count 6 signal 479 is the decoded output signal for this counter 402. The count 6 signal 479 becomes logic high when the counter 402 counts to 6 (110 in binary). One way the counter can be reset to the count 0 (000 in binary) is by any change in the Enable signal 235. If the Enable signal 235 changes from low to high, signal 411 from transition detector 498 will become momentarily high. If the Enable signal 235 changes from high to low, signal 411 will also become momentarily high. If signal 411 becomes high, signal 424 from OR gate 433 becomes high and resets the counter back to the count 0 (000 in binary). Thus, the counter 402 will only keep counting if there is a pattern of consecutive high or low Enable signals 235.

After start-up, when the counter 402 counts to N equals 6 (110 in binary), signal 479 becomes high, and if Enable signal 235 has been high during all this time, AND gate 469 will change the move-up signal 408 to logic 1. When the move-up signal 408 becomes logic 1, latch 457 will set medium signal 303c to logic 1. At this point the state machine is in the lower medium state 355. As soon as the transition of medium signal 303c from logic 0 to 1 is detected, signal 423 will become momentarily logic 1, causing signal 431 and consequently signal 424 to become logic 1 and resetting the counter to the count 0 (000 in binary).

When the counter counts to 6 again (110 in binary), signal 479 becomes high again, and if Enable signal 235 has been high during all this time, gate 469 will change the move-up signal 408 to logic 1. When the move-up signal 408 becomes logic 1 and since medium signal 303c is already logic 1, latch 459 will set the high signal 418 to logic 1. At this point, the state machine 351 is in the high state 359. The high current limit signal 303a is only logic 1 when both the high signal 418 and the Enable signal 235 are high. As soon as the transition of high state signal 418 from logic 0 to 1 is detected, signal 420 will become momentarily logic 1, causing signal 431 and consequently signal 424 to become logic 1 and resetting the counter to the count 0 (000 in binary).

When the counter counts to 6 again (110 in binary), signal 479 becomes high again, and if Enable signal 235 has been high during all this time, gate 469 will change the move-up signal 408 to logic 1. When the move-up signal 408 becomes logic 1, and since high signal 418 is already logic 1, latch 473 will set super high signal 309 to logic 1. At this point the state machine circuitry 301 is in super-high state 361.

In one embodiment, to go down from super-high state 361, the Enable signal 235 has to stay low. When the counter counts to 6 (110 in binary), signal 479 becomes high, and if Enable signal 235 has been low during all this time, gate 471 will change the move-down signal 407 to logic 1. When the move-down signal 407 becomes logic 1, latch 473 will reset super high signal 309 to logic 0. At this point the state machine circuitry 301 is back in high state 359. As soon as the transition of super high signal 309 from logic 1 to 0 is detected, signal 415 will become momentarily logic 1, causing signal 431 and consequently signal 424 to become logic 1 and resetting the counter to the count 0 (000 in binary).

When the counter counts to 6 again (110 in binary), signal 479 becomes high again, and if Enable signal 235 has been low during all this time, gate 471 will change the move-down signal 407 to logic 1. When the move-down signal 407 becomes logic 1, and if nsuper-high signal 416 is logic 1, latch 459 will reset high signal 418 to logic 0. At this point the state machine circuitry 301 is back in upper medium state 357. As soon as the transition of high state signal 418 from logic 1 to 0 is detected, signal 421 will become momentarily logic 1, causing signal 431 and consequently signal 424 to become logic 1 and resetting the counter to the count 0 (000 in binary).

When the counter counts to 6 again (110 in binary), signal 479 becomes high again, and if Enable signal 235 has been low during all this time, gate 471 will change the move-down signal 407 to logic 1. When the move-down signal 407 becomes logic 1, and if nhigh signal 425 is logic 1, latch 457 will reset medium signal 303c to logic 0. At this point the state machine circuitry 301 is back to low state 353.

The medium state is additionally controlled by latch 463. The output of latch 463 decides whether or not the state machine circuitry 301 is in upper-medium 357 or lower-medium state 355. During power-up, latch 463 is reset. Transition from high state 359 to upper medium state 357 sets the output of latch 463 to logic 1, and transition from upper medium state 357 to low state 353 resets the output of latch 463 to logic 0. Latch 463 operation is as follows. Signal 421 will become logic 1 on the high signal 418 transition from 1 to 0. This will set latch 463, making the upper-medium signal 303b logic 1. On the other hand, signal 428 will become logic 1 on the medium signal 303c transition from 1 to 0. This will reset latch 463, making the upper-medium signal 303b logic 0.

Figure 5:
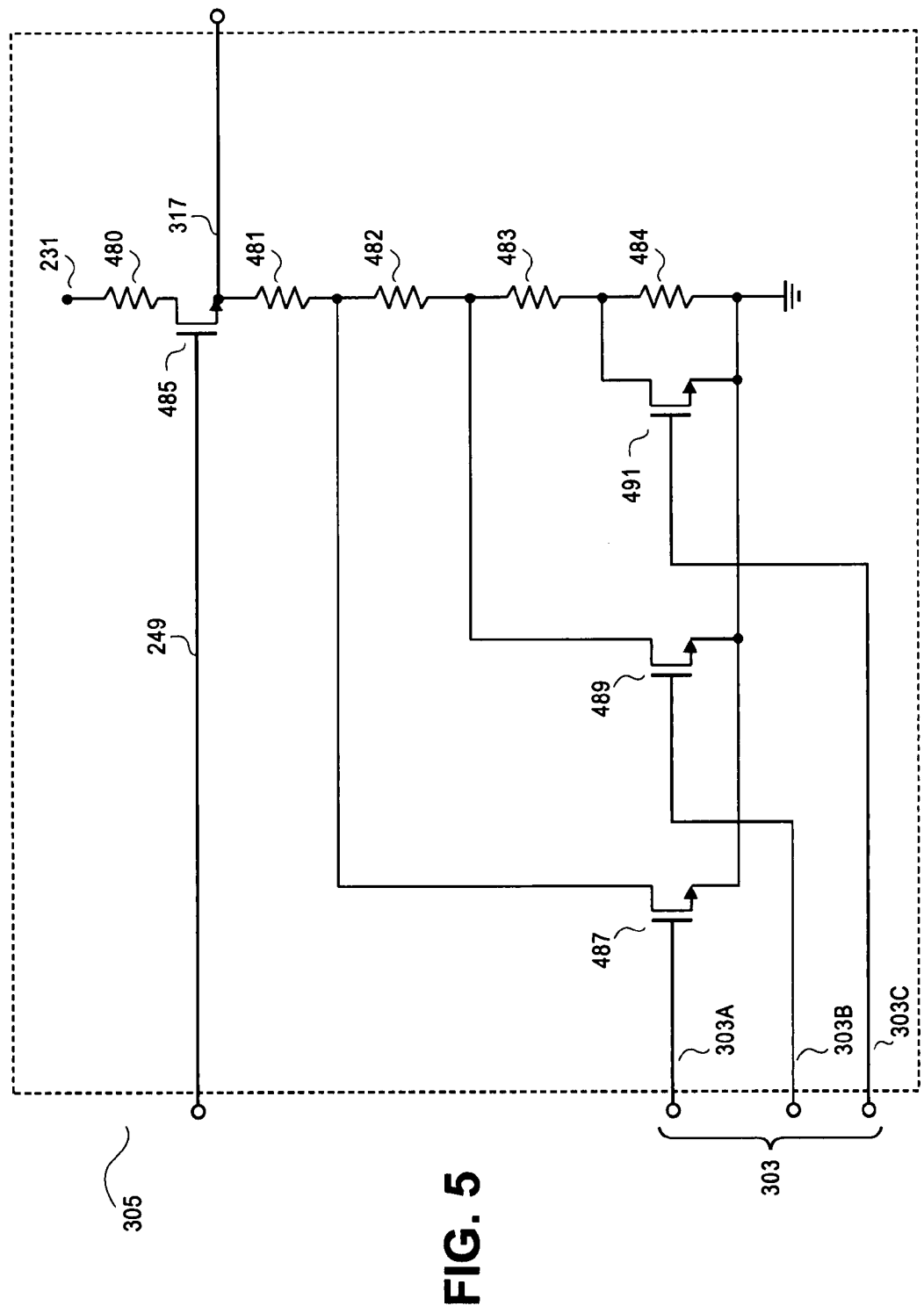
FIG. 5 is a schematic illustrating one embodiment of current limit adjust circuitry in accordance with the teachings of the present invention.

FIG. 5 is a schematic illustrating one embodiment of current limit adjust circuitry 305 of switching regulator circuit 139 in accordance with the teachings of the present invention. As shown, a voltage divider circuit is formed with resistor 480 transistor 485 and resistors 481, 482, 483 and 484 coupled in series between drain terminal 231 and ground. The inputs to current limit adjust circuit 305 are the drain signal 231, gate signal 249, and signal 303a/b/c. The output of current limit adjust circuitry 305 is signal 317. As shown in FIG. 5, when medium signal 303c is logic 1, resistor 484 is shorted in the current limit adjust circuitry 305. When upper-medium signal 303b is logic 1, resistors 484 and 483 are shorted in the current limit adjust circuitry 305. When high-Ilim signal 303a is logic 1, resistors 484, 483 and 482 are shorted in the current limit adjust circuitry 305. The more resistors are shorted, the lower the voltage at signal 317 becomes relative to the drain voltage at drain terminal 231, thus adjusting or selecting the current limit setting.

Figure 6:
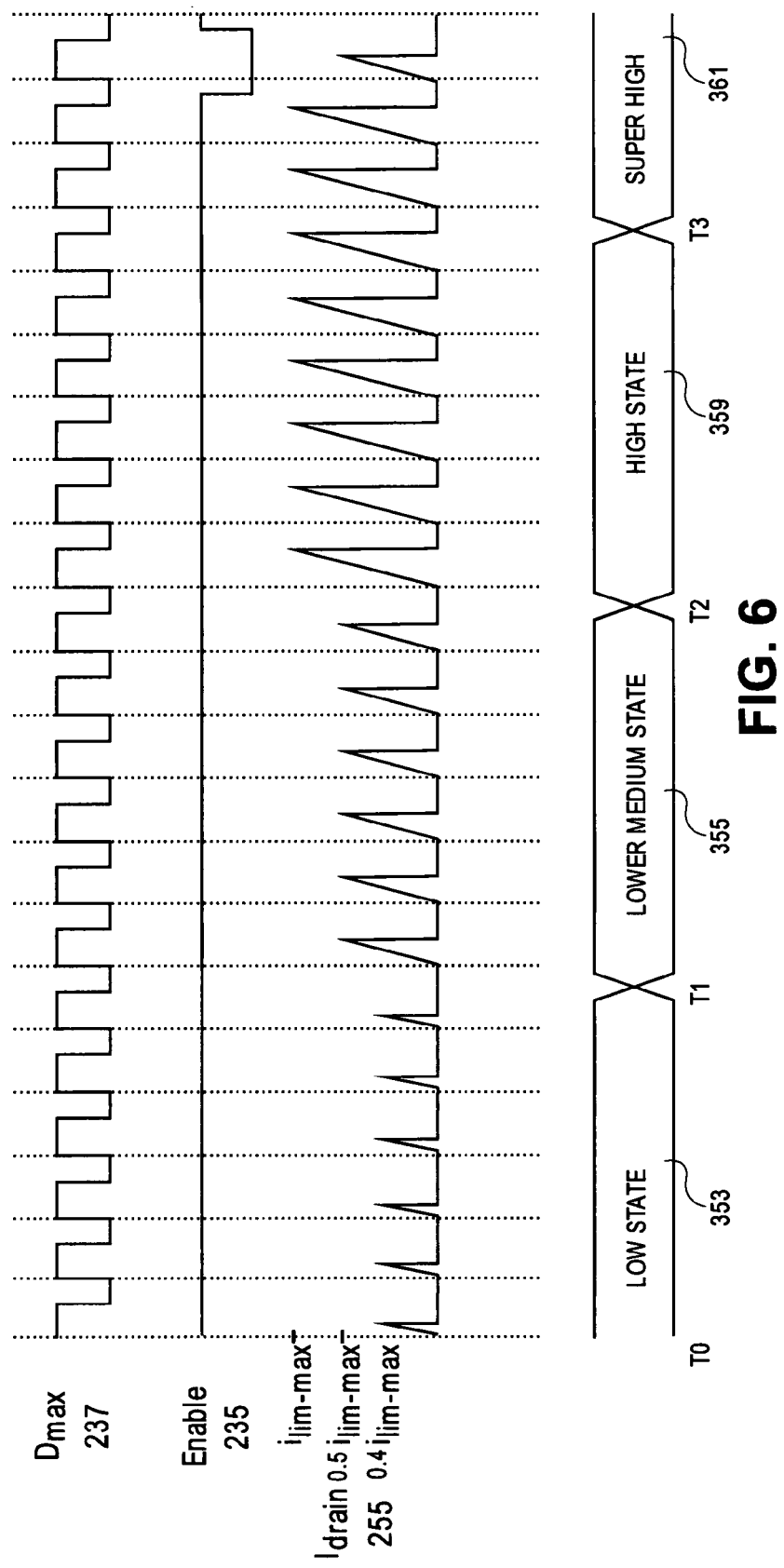
FIG. 6 is a timing diagram illustrating waveforms of one embodiment of switching regulator operating in various states of a state machine with varying current limit levels in accordance with the teachings of the present invention.

FIGS. 6-9 are timing diagrams illustrating waveforms of various embodiment of switching regulator circuit 139 operating in various states of a state machine circuitry 301 with varying current limit levels in accordance with the teachings of the present invention. As shown in FIG. 6, at time T0, the state machine circuitry 301 is in the low state 353. Accordingly the current limit for the drain current IDRAIN 255 is 0.4 Ilim-max with Enable signal 235 equal to 1. After a pattern of N equals 6 Enable signals 235 equal to 1 for the preceding N equals 6 drive signal cycles, state machine circuitry 301 transitions to lower medium state 355 at time T1. Accordingly the current limit for the drain current IDRAIN 255 is 0.5 Ilim-max with Enable signal 235 equal to 1. After a pattern of another N equals 6 Enable signals 235 equal to 1 for the preceding N equals 6 drive signal cycles, state machine circuitry 301 transitions to high state 359 at time T2. Accordingly the current limit for the drain current IDRAIN 255 is Ilim-max with Enable signal 235 equal to 1. After a pattern of another N equals 6 Enable signals 235 equal to 1 for the preceding N equals 6 drive signal cycles, state machine circuitry 301 transitions to super high state 361 at time T3. Accordingly the current limit for the drain current IDRAIN 255 is Ilim-max with Enable signal 235 equal to 1 and 0.5 Ilim-max with Enable signal 235 equal to 0.

Figure 7:
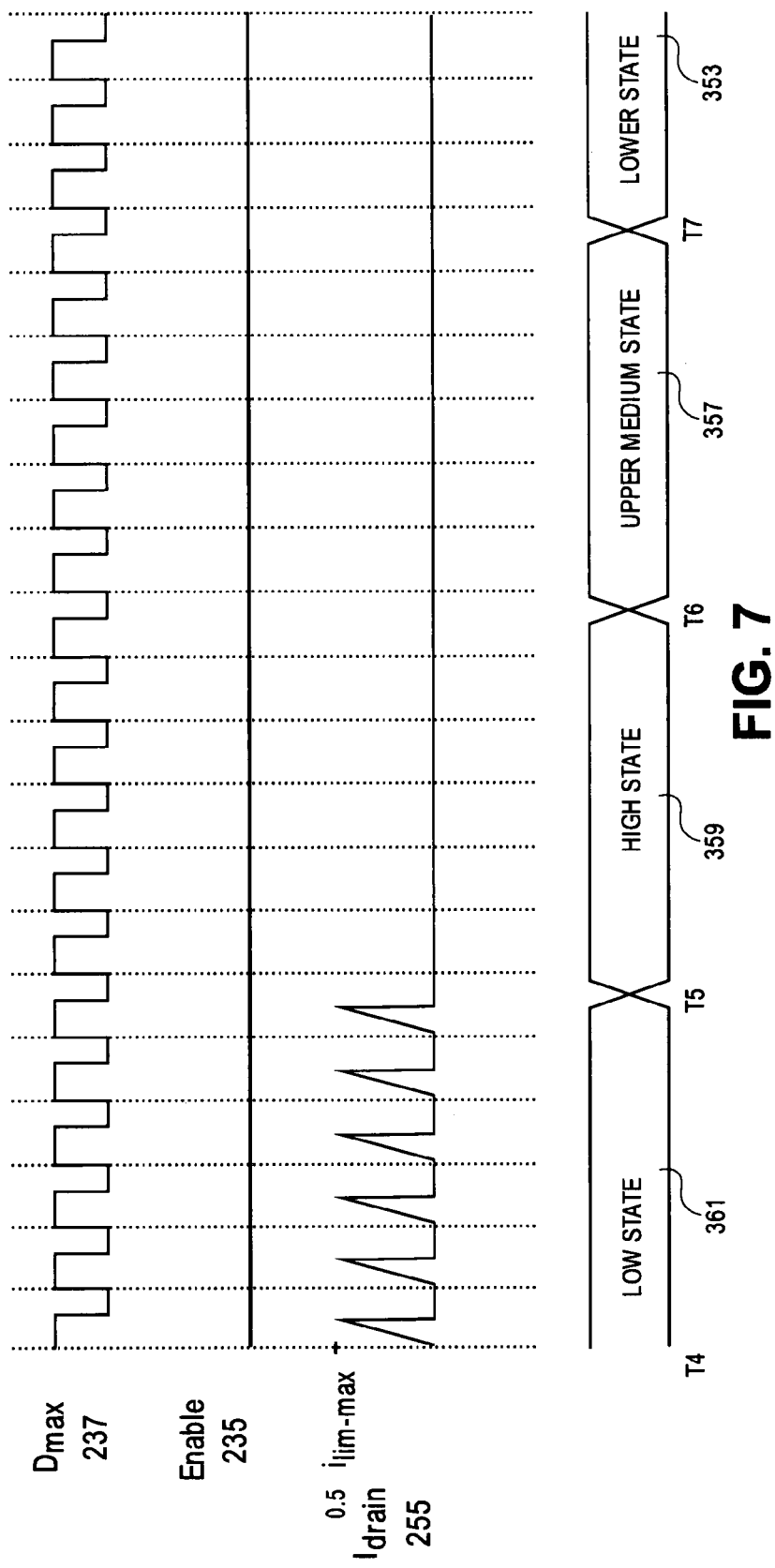
FIG. 7 is a timing diagram illustrating waveforms of another embodiment of switching regulator operating in various states of a state machine with varying current limit levels in accordance with the teachings of the present invention.

As shown in FIG. 7, at time T4, the state machine circuitry 301 is in the super high state 361. Accordingly, the current limit for the drain current IDRAIN 255 is 0.5 Ilim-max with Enable signal 235 equal to 0. After a pattern of N equals 6 Enable signals 235 equal to 0 for the preceding N equals 6 drive signal cycles, state machine circuitry 301 transitions to high state 359 at time T5. Accordingly, the cycles in drive signal 249 are skipped with Enable signal 235 equal to 0. After a pattern of another N equals 6 Enable signals 235 equal to 0 for the preceding N equals 6 drive signal cycles, state machine circuitry 301 transitions to upper medium state 357 at time T6. Accordingly, the cycles in drive signal 249 are skipped with Enable signal 235 equal to 0. After a pattern of another N equals 6 Enable signals 235 equal to 0 for the preceding N equals 6 drive signal cycles, state machine circuitry 301 transitions to low state 353 at time T7. Accordingly, the cycles in drive signal 249 are skipped with Enable signal 235 equal to 0.

Figure 8:
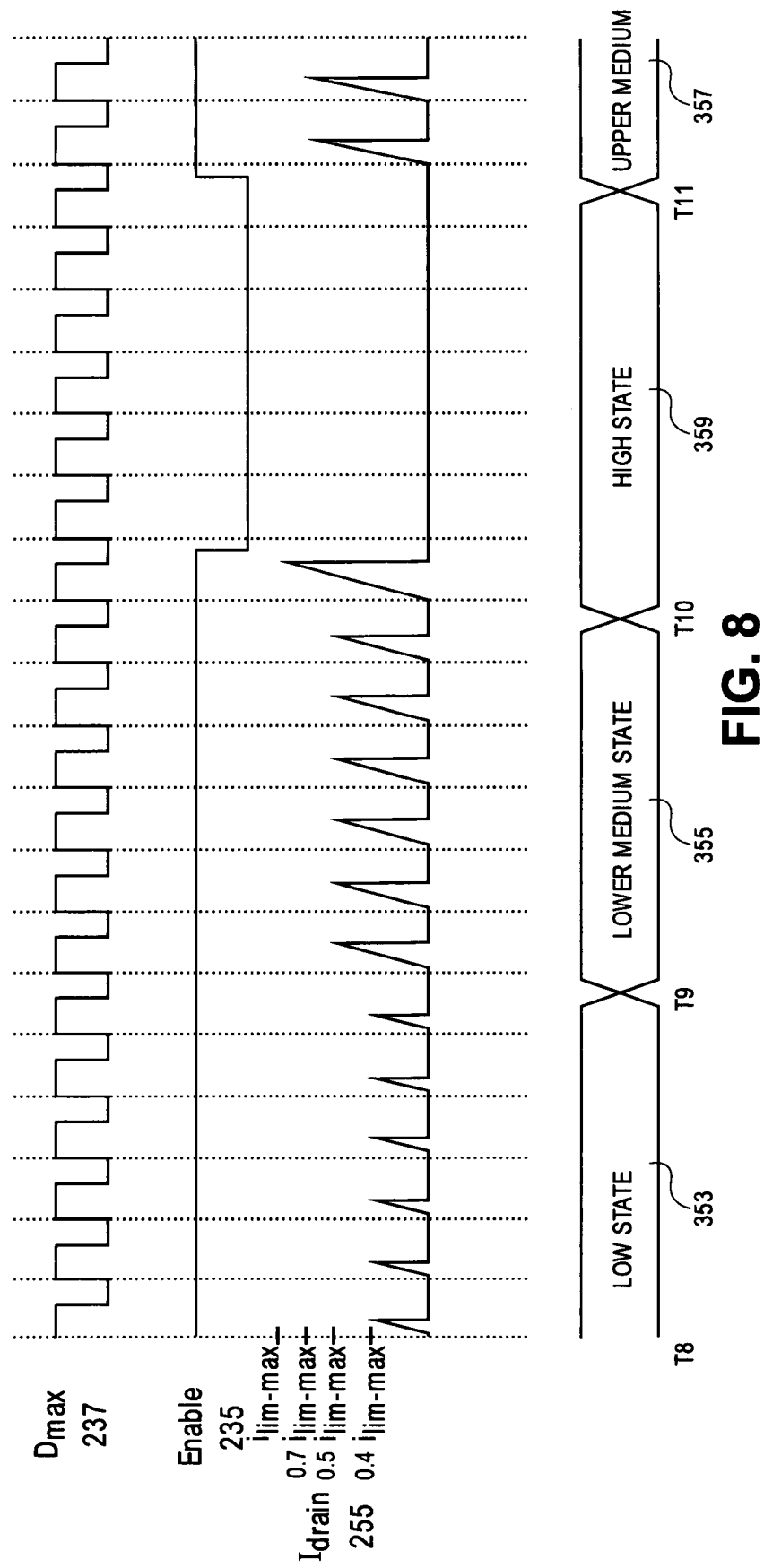
FIG. 8 is a timing diagram illustrating waveforms of yet another embodiment of switching regulator operating in various states of a state machine with varying current limit levels in accordance with the teachings of the present invention.

As shown in FIG. 8, at time T8, the state machine circuitry 301 is in the low state 353. Accordingly, the current limit for the drain current IDRAIN 255 is 0.4 Ilim-max with Enable signal 235 equal to 1. After a pattern of N equals 6 Enable signals 235 equal to 1 for the preceding N equals 6 drive signal cycles, state machine circuitry 301 transitions to lower medium state 355 at time T9. Accordingly, the current limit for the drain current IDRAIN 255 is 0.5 Ilim-max with Enable signal 235 equal to 1. After a pattern of another N equals 6 Enable signals 235 equal to 1 for the preceding N equals 6 drive signal cycles, state machine circuitry 301 transitions to high state 359 at time T10. Accordingly, the current limit for the drain current IDRAIN 255 is Ilim-max with Enable signal 235 equal to 1 and cycles in drive signal 249 are skipped with Enable signal 235 equal to 0. After a pattern of N equals 6 Enable signals 235 equal to 0 for the preceding N equals 6 drive signal cycles, state machine circuitry 301 transitions to upper medium state 357 at time T11. Accordingly, the current limit for the drain current IDRAIN 255 is 0.7 Ilim-max with Enable signal 235 equal to 1.

It is appreciated that because of the hysteretic nature of the upper and lower medium states 359 and 357, state machine 351 moves up first to high state 359 before moving back down to upper medium state 357. Stated differently, state machine 351 transitions from lower medium state 355 directly to high state 359 without transitioning through upper medium state 357. Therefore, the current limit of upper medium state 357 is not selected when transitioning from lower medium state 355 to high state 359.

Figure 9:
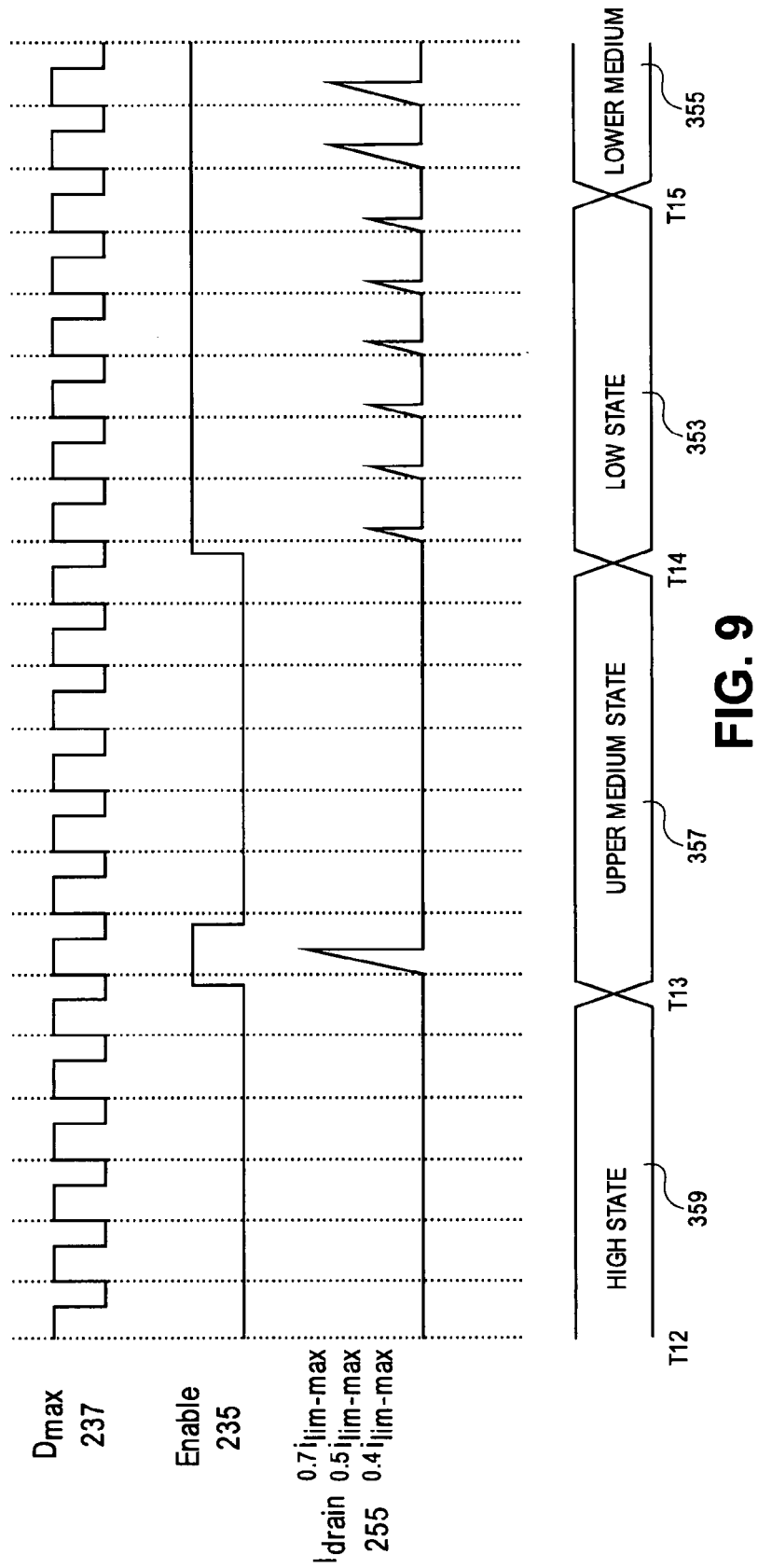
FIG. 9 is a timing diagram illustrating waveforms of still another embodiment of switching regulator operating in various states of a state machine with varying current limit levels in accordance with the teachings of the present invention.

As shown in FIG. 9, at time T12, the state machine circuitry 301 is in the high state 359. Accordingly, the cycles in drive signal 249 are skipped with Enable signal 235 equal to 0. After a pattern of N equals 6 Enable signals 235 equal to 0 for the preceding N equals 6 drive signal cycles, state machine circuitry 301 transitions to upper medium state 357 at time T13. Accordingly, the current limit for the drain current IDRAIN 255 is 0.7 Ilim-max with Enable signal 235 equal to 1 and the cycles in drive signal 249 are skipped with Enable signal 235 equal to 0. After a pattern of another N equals 6 Enable signals 235 equal to 0 for the preceding N equals 6 drive signal cycles, state machine circuitry 301 transitions to low state 353 at time T14. Accordingly, the current limit for the drain current IDRAIN 255 is 0.4 Ilim-max with Enable signal 235 equal to 1. After a pattern of N equals 6 Enable signals 235 equal to 1 for the preceding N equals 6 drive signal cycles, state machine circuitry 301 transitions to lower medium state 355 at time T15. Accordingly, the current limit for the drain current IDRAIN 255 is 0.5 Ilim-max with Enable signal 235 equal to 1.

It is appreciated that because of the hysteretic nature of the upper and lower medium states 357 and 355, state machine circuitry 301 moves down first to low state 353 before moving back up to lower medium state 355. Stated differently, state machine circuitry 301 transitions from upper medium state 357 directly to low state 353 without transitioning through lower medium state 355. Therefore, the current limit of lower medium state 355 is not selected when transitioning from upper medium state 357 to low state 353.

In the foregoing detailed description, the method and apparatus of the present invention has been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. A method, comprising:
   switching a power switch coupled in series with an energy transfer element of a power supply with a drive signal to regulate a power level of an output of the power supply;
   adjusting an on/off cycle ratio of the drive signal responsive to the output of the power supply;
   selecting one of a plurality of current limit settings responsive to the output of the power supply;
   limiting a current through the power switch to the selected one of the plurality of current limit settings, wherein a range of power levels delivered to the output of the power supply when one of the current limit settings is selected overlaps with a range of power levels delivered to the output of the power supply when another of the current limit settings is selected.

2. The method of claim 1, wherein adjusting the on/off cycle ratio of the drive signal comprises adjusting the on/off cycle ratio to between a minimum on/off cycle ratio and a maximum on/off cycle ratio, wherein a range of power levels delivered to the output of the power supply when one of the current limit settings is selected and the drive signal is operating at the maximum on/off cycle ratio overlaps with a range of power levels delivered to the output of the power supply when another of the current limit settings is selected and the drive signal is operating at the minimum on/off cycle ratio.

3. The method of claim 1, wherein adjusting the on/off cycle ratio of the drive signal comprises maintaining a frequency of the drive signal to a frequency value outside an audible frequency range.

4. The method of claim 1, wherein adjusting the on/off cycle ratio of the drive signal comprises maintaining a frequency of the drive signal above an audio frequency range for flux density values of the energy transfer element that are greater than a flux density threshold value.

5. The method of claim 4, wherein the flux density threshold value is a lower end of a range of flux density threshold values of the energy transfer element that result in a generation of audible noise from the energy transfer element if operated within the audio frequency range.

6. The method of claim 1, wherein adjusting the on/off cycle ratio of the drive signal comprises:
   maintaining an on time of a current cycle of the drive signal; and
   disabling an on time of a next cycle of the drive signal in response to changes in the load.

7. The method claim 6, wherein selecting one of the plurality of current limit settings comprises changing states in a state machine responsive to the output of the power supply for a plurality of preceding drive signal cycles.

8. The method of claim 7, wherein changing states in a state machine comprises counting a number of consecutive output values of the output of the power supply within a first range of output values of the output of the power supply for a plurality of N drive signal cycles.

9. The method of claim 1, wherein the plurality of current limit settings comprise a first current limit setting and a second current limit setting, wherein the power level output by the power supply is between a first minimum power level and a first maximum power level when the first current limit setting is selected and is between a second minimum power level and a second maximum power level when the second current limit setting is selected, wherein the first minimum power level is less than the second minimum power level and the first maximum power level is greater than the second minimum power level.

10. The method of claim 1, wherein adjusting the on/off cycle ratio of the drive signal comprises adjusting the on/off cycle ratio to between a minimum on/off cycle ratio and a maximum on/off cycle ratio, wherein the power level output by the power supply when each of the plurality of current limits settings is selected approximately corresponds to respective minimum and maximum power levels when the drive signal is operating at the respective minimum and maximum on/off cycle ratio.

* * * * *